Patented Jan. 29, 1924.

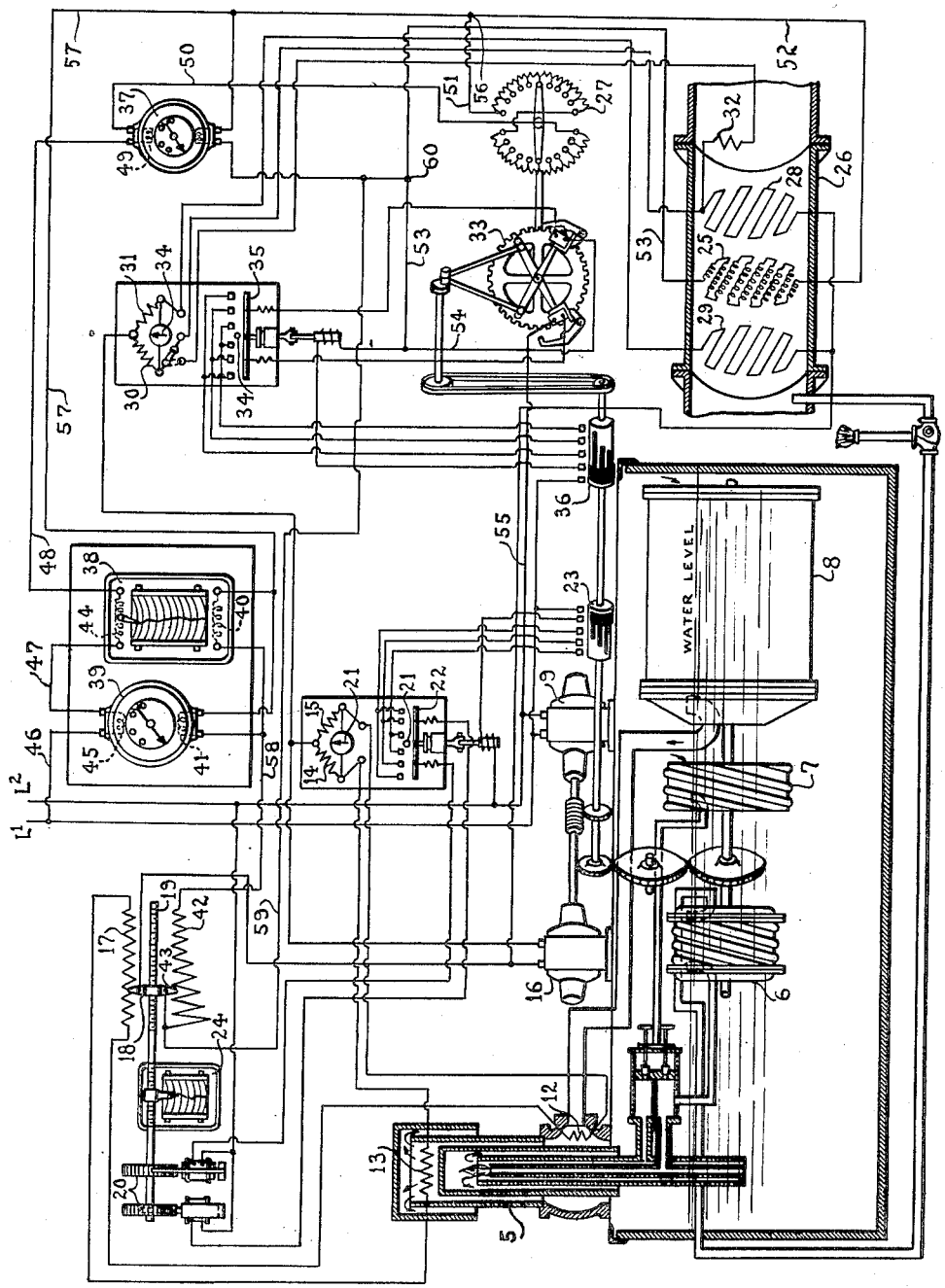

1,482,091

UNITED STATES PATENT OFFICE

HORACE N. PACKARD, OF MILWAUKEE, WISCONSIN, ASSIGNOR TO THE CUTLER-HAMMER MFG. CO., OF MILWAUKEE, WISCONSIN, A CORPORATION OF WISCONSIN.

APPARATUS FOR DETERMINING AND ALSO INDICATING THE TOTAL AVAILABLE HEAT OF A FLOW OF COMBUSTIBLE FLUID.

Application filed August 18, 1921. Serial No. 493,479.

*To all whom it may concern:*

Be it known that I, HORACE N. PACKARD, a citizen of the United States, residing at Milwaukee, in the county of Milwaukee and State of Wisconsin, have invented new and useful Improvements in Apparatus for Determining and Also Indicating the Total Available Heat of a Flow of Combustible Fluid, of which the following is a full, clear, concise, and exact description, reference being had to the accompanying drawing, forming a part of this specification.

This invention relates to apparatus for determining and also indicating the total available heat of a flow of combustible fluid, although certain features of the invention are also applicable to other than combustible fluids.

More particularly the invention relates to the ascertainment of the product of the total or gross available heat per unit quantity of a fluid times the total quantity of such fluid flowing in a given or unit time.

In the production of illuminating gas and also in numerous chemical and other industrial processes involving the use of heat derived from gaseous or other fluid it is essential or exceedingly desirable to ascertain not only the quantity of fluid supplied per unit time and the total available heat per unit quantity of the fluid, but also to ascertain directly the total quantity of heat available from the flow of such fluid during a given or unit time, the total or gross available heat being understood herein to be the total quantity of heat units which may be derived from the fluid through subjection thereof to the contemplated treatment or cycle.

The present invention has among its objects that of providing improved and refined apparatus for ascertaining such value directly.

Another object is that of providing apparatus for the foregoing purposes utilizing a minimum number of special parts and which may with a minimum of expenditure of time and labor be applied to existing or known apparatus.

Another object is that of providing apparatus for indicating and also for recording simultaneously both the rate of flow of the fluid and the heating value per unit quantity thereof and also the total available heat of such flow per unit time or throughout a given period.

Other objects and advantages will hereinafter appear.

The accompanying drawing, consisting of a single figure, illustrates one form of such apparatus.

In the operation of such apparatus the total available heat per unit quantity of the fluid is ascertained continuously, whereas, the quantity of the fluid flowing in unit time, that is to say, the rate of flow of fluid, is also ascertained in a known manner, whereas, suitable indicating or recording devices, or both, are subjected to influence jointly by the results of the aforementioned ascertainments, whereby said devices are adapted respectively to indicate or record the resultant of such combined influences, namely, the total available heat, as aforecharacterized, of the flow of fluid.

For purposes of illustration a known type of calorimeter for ascertaining the total available heat per unit quantity of the fluid is illustrated, such calorimeter being preferably of the character disclosed and claimed in my copending application, Serial No. 347,227, filed Dec. 24, 1919. Although it is to be understood that other forms of calorimeters adapted to effect continuous indications and also to effect automatic application of the same corrective factors with comparable degrees of accuracy may be substituted if desired.

The apparatus employed for ascertaining the quantitative rate of flow of the fluid comprises preferably a so-called Thomas meter substantially of the type disclosed in patent to Thomas No. 1,222,492 of April 10, 1917, as modified by the disclosure of patent to Wilson and Packard No. 1,261,086 of April 2, 1918, which type of meter lends itself readily to combination with a calorimeter for instant purposes.

Referring to the drawing, the same illustrates a calorimeter of the character aforedescribed and comprising essentially a burner 5 to be supplied with test gas, combustion air and cooling fluid, also preferably comprising air, said test gas and cooling air being supplied in definitely and continuously proportioned quantities and under like conditions of temperature pressure and saturation as by means of synchronously driven wet displacement pumps 6 and 8 acting in conjunction with a common liquid seal as in my application aforementioned.

Combustion air is also supplied to the burner under conditions such as to insure that the supply thereof be fully adequate or even ample for complete combustion of the test gas and be maintained of an order of magnitude comparable to that of the supply of the latter though not requiring definite or even approximate proportionality thereto.

Such conditions of supply of combustion air may be attained in a convenient but needlessly precise manner by means of an additional pump 7 operating under the conditions aforedescribed.

Resistance thermometers 12 and 13 are arranged within the cooling fluid chamber of the burner in relations such as to be influenced by the temperature of the cooling fluid before and after absorption thereby of the total heat available through subjection of the test quantity of the fluid to the contemplated cycle, that is, in the present case, combustion of the test gas with the combustion air. Said resistance thermometers are connected to form in conjunction with fixed resistances 14 and 15 a Wheatstone bridge, the latter having certain connections providing for electrical energization thereof as from the direct current generator indicated at 16, the latter to be conveniently driven from the motor 9 as illustrated.

An additional step 17 of fixed resistance is included in circuit between the resistance thermometers 12 and 13, whereas, connection of this side of the bridge with its supply circuit is effected at an intermediate and variable point of such fixed resistance as by means of a reciprocable slider 18, the latter being operable by means of a screw 19 which in turn is adapted to be actuated in opposite directions by a duplex ratcheting mechanism indicated generally at 20.

A galvanometer having a needle 21 is connected across the Wheatstone bridge as illustrated, said needle serving in conjunction with a clamping switch mechanism 22 and with a commutator device 23 to be driven at a reduced speed by motor 9 for controlling the operation of the ratcheting device 20, causing the latter to vary the position of the slider 18 and thereby adjust and restore the balance of the Wheatstone bridge following unbalance of the latter due to variation in quantity of the heat available from the fluid. The action of the aforedescribed parts is fully disclosed in my copending application aforedesignated and since such specific features per se constitute no part of the instant invention, further description thereof herein is deemed unnecessary, except to state that here as in said former application the calorimeter described is adapted to measure total available heat per unit quantity as distinguished from the net heating values determined by certain forms of calorimeter which are inadapted to effect certain corrections which inhere in the operation of the instant calorimeter. Further, the movement of the screw 19 may be employed here as in the application aforementioned for effecting indication of either instantaneous or integrated values, or both, of the total available heat per unit quantity of the fluid, as by means of the recorder 24 illustrated.

The fluid meter preferably employed herein comprises essentially an electric resistance heater 25 located within the main fluid conduit 26 and adapted to be supplied with current from lines $L'$ $L^2$, the value of the energization so supplied being regulable by means of the rheostat 27. Resistance thermometers 28 and 29 are arranged within conduit 26 for subjection respectively to the temperature of the fluid flowing therein before and after heating by the heater 25. Said resistance thermometers are connected in corresponding branches of a Wheatstone bridge, the other two branches of the bridge comprising fixed resistances 30 and 31, whereas, a temperature difference resistance 32 is arranged to be in series with the thermometer resistance 28 under normal working conditions. A ratcheting device 33 is arranged to be controlled by the Wheatstone bridge through a galvanometer needle 34 acting in conjunction with a clamping device 35 and a commutator 36 all in the manner aforedescribed and is adapted to vary the adjustment of the rheostat 27.

Thus so long as the rate of flow of fluid in the conduit 26 is such as to maintain the Wheatstone bridge in balance no adjustment of rheostat 27 by means of ratcheting mechanism 33 occurs, but upon variation in rate of flow of the fluid such as to cause unbalance of the bridge said rheostat is adjusted automatically to vary the energy input and consequent heating effect of the heater 25 to thereby restore the balance of the bridge, all in a manner more fully disclosed in conjunction with the patent aforementioned. A watt hour meter 37, which may be of either the instantaneous or integrated indication type, having energizing coils connected respectively in series with and in shunt to the heater 25 is thereby adapted to indicate the quantitative rate of flow of the fluid in a known manner.

A further graphic watt meter 38 and an integrating watt hour meter 39 are provided for metering the total available heat of the fluid flowing in the conduit 26 per unit time, and to such end said metering devices are respectively provided with coils 40 and 41 to be connected across the circuit of heater 25 in parallel to one another through a common variable resistance 42, the value of said resistance in circuit being determinable by the total available heat per unit quantity of the test fluid. To such end the slider 18 of the calorimeter may be preferably provided with an insulated extension 43 movable therewith and adapted to so vary the value of the resistance 42 in circuit as to maintain the total value of resistance in the circuit of either coil at all times a function of such heating value, thus subjecting the metering devices last mentioned to influence in accordance with and proportioned to such heating value of the test fluid.

Moreover since in the present instance the slider together with its extension are adapted to move in accordance with a uniform straightline law, whereas, the necessary resistance variation does not follow a straight line law, the resistance 42 is so wound and apportioned with reference to the movement of the slider extension 43 that during such movement the value of said resistance in circuit is varied to maintain such necessary relation. However, it is obvious that if desired said resistance may be so wound and arranged as to vary its value uniformly upon uniform movement of the extension 43, the movement of said extension, or the part corresponding thereto, being varied with reference to the movement of the slider 18 as by a multiplying cam lever or the like whereby the necessary correlation between the movement of said slider and the resultant variation of the resistance 42 in circuit is maintained.

The joint supply circuit of coils 40 and 41 is furthermore as aforestated, arranged in a shunt relation to the heater 25 of the fluid meter thereby subjecting the metering devices 38 and 39 to further control as a function of the heat input to the fluid flowing in the conduit 25 whereas said recorder and indicator are provided with additional coils 44 and 45 connected in series with one another and with said heater 25 as illustrated.

From the foregoing it results that said indicating and recording devices which tend as aforementioned to respond to influence of the calorimeter are subjected to further influence by the fluid meter whereby the indications of said devices comprise the product of such influences, namely, the total available heat of the quantity of fluid flowing in the conduit 26 in unit time or throughout a given or desired period, the same being the indications sought and contemplated herein.

Although the electrical connections for the instruments 38 and 39 are comparatively obvious the same may be described briefly as follows: Considering first the circuit of the series coils of said indicating devices, such circuit may be traced from line L' by conductor 46 through the coil 45 thence by conductor 47 through coil 44 by conductor 48 through the series coil 49 of the indicator 37 thence by conductor 50 through rheostat 27 by conductors 51 and 52 through heater 25 by conductors 53, 54 and 55 to line L², the corresponding series coils of the three instruments 37, 38 and 39 being thus connected in series with one another and with the heater 25 of the fluid meter as aforestated.

The circuit of the shunt coils of the aforementioned instruments 38 and 39 may be traced as follows. Beginning at a point 56 in the heater circuit last traced by conductor 57 through said instrument shunt coils in parallel thence from the left hand ends of each of said coils by means of common conductor 58 through resistance 42 or through the portion thereof determined by the positioning of the extension 43 thence by conductor 59 to a point 60 in the aforedescribed heater circuit upon the opposite side of the heater. The aforedescribed connections obviously are such as to produce a shunt arrangement of said instrument coils with reference to said heater and to one another whereby said coils are subjected to influence in accordance with the voltage drop across said heater subject, however, to further influence in accordance with the value of the resistance 42 in circuit, the latter being as aforestated, a function of the total available heat per unit quantity of the test fluid.

The construction and arrangement described thus provide for direct indicating and recording of the total available heat of the quantity of fluid flowing in the conduit 26 during unit time or throughout a given or desired period whereas the quantity of fluid so flowing is indicated by the integrating watt meter 37 and obviously may be recorded if desired. Similarly the total available heat per unit quantity of the fluid is recorded continuously by means of the graphic indicator 24 which latter instrument may be supplemented by an integrating indicator if desired. It is likewise obvious that during inaction of the instruments 38 and 39 as for purposes of calibration, inspection, repair or the like the quantity indicator 37 and the calorific recorder 24 nevertheless continue to function or either of said latter instruments may operate independently and to the exclusion of the other, whereby an exceedingly flexible system comprising chiefly standard parts is provided.

What I claim as new and desire to secure by Letters Patent is:

1. In apparatus for ascertaining the total available heat of a flow of fluid, the combination with indicating means, of means for causing the former means to indicate as a function of both the total heat per unit quantity of the fluid and the quantitative rate of flow thereof, the second mentioned means including means to compensate for variations in temperature, pressure and saturation of the fluid and including means rendering unnecessary division of the stream of fluid for ascertaining its quantitative rate of flow.

2. The combination with means for continuously measuring instantaneous values of the rate of flow of a fluid independently of variations in temperature, pressure and saturation condition thereof, of distinct means for continuously measuring instantaneous values of the total available heat per unit quantity of the flowing fluid and means for combining corresponding instantaneous values so obtained to thereby provide for automatically indicating instantaneous values of the total available heat of the flow of fluid.

3. In apparatus for ascertaining the total available heat of a flow of combustible fluid during unit time, the combination with a meter for determining the quantitative rate of flow of the fluid independent of variations in temperature, pressure or saturation condition thereof, of means for automatically and continuously integrating with the determinations of said meter a factor proportional to the instantaneous values of the total available heat per unit quantity of the fluid to thereby effect indication of the rate of flow of available heating units of said fluid.

4. The combination with a calorimeter having an element adapted to move in accordance with variations in heating value per unit quantity of a flowing fluid, an indicating device having an actuating element subjected to control in accordance with the quantitative rate of flow of the fluid and substantially independent of variations in temperature, pressure or saturation condition of the fluid, and means subjecting said actuating element to further control by said first mentioned element.

5. The combination with a calorimeter having an element movable in response to variations in heating value per unit quantity of a flowing fluid, an indicating device having an operating coil subjected to energization control by the rate of flow of the fluid and additional control means for said device comprising a resistance in circuit with a coil thereof to be commutated in accordance with the degree and character of movement of said movable element.

6. The combination with a calorimeter having an element movable in response to variations in heating value per unit quantity of a flowing fluid and substantially independently of variations in temperature, pressure or saturation condition of the fluid, of an indicating device having an actuating element and means subjecting said element to a degree of energization proportional to the rate of flow of the fluid, and means for causing the energization of said latter element to vary as a function of the degree and character of movement of said calorimeter element.

7. In apparatus for ascertaining the heating value of a flow of fluid during unit time, the combination with a resistance heater to be located in the fluid conduit for imparting heat to the flowing fluid, resistance thermometers to be subjected respectively to the temperature of the flowing fluid before and after heating by said heater and means for controlling the energy input to said heater to thereby maintain a constant value of the temperature difference of said thermometers, of an indicator having an actuating coil subjected to energization variable in value as a function of the energy input to said heater, and means subjecting said coil to further energization control in accordance with the heating value per unit quantity of the flowing fluid.

8. In apparatus for ascertaining the heating value of a flow of fluid during unit time, the combination with a resistance heater to be located in the fluid conduit for imparting heat to the flowing fluid, resistance thermometers to be subjected respectively to the temperature of the flowing fluid before and after heating by said heater and means for controlling the energy input to said heater to thereby maintain a constant value of the temperature difference of said thermometers, of an indicator having an actuating coil subjected to energization variable in value as a function of the energy input to said heater, a calorimeter having an element adapted to move in accordance with variations in the total available heat per unit quantity of the flowing fluid and a resistance to be in circuit with said indicator coil and to be commutated with respect to said circuit by such movement of said calorimeter element.

9. In apparatus for ascertaining the heating value of a flow of combustible fluid, the combination with a calorimeter comprising a burner, means to supply thereto in definite proportions test fluid and cooling fluid, the latter to absorb the heat of combustion of the test fluid, a movable element and means comprising resistance thermometers adapted to measure the resultant temperature rise of the cooling fluid for causing said element to move in accordance with the degree and character of variations in heating value per unit quantity of the test fluid, of an indicating device, means subjecting said device to influence in accordance with the degree and character of movement of said calorimeter movable element, and means subjecting said indicating device to further influence in accordance with the quantitative rate of flow of the fluid.

10. In apparatus for ascertaining the heating value of a flow of fluid during unit time, the combination with a resistance heater to be located in the fluid conduit for imparting heat to the flowing fluid, resistance thermometers to be subjected respectively to the temperature of the flowing fluid before and after heating by said heater and means for controlling the energy input to said heater to thereby maintain a constant value of the temperature difference of said thermometers, of an indicator having an actuating coil subjected to energization variable in value as a function of the energy input to said heater, a calorimeter comprising a burner, means to supply thereto in definite proportions test fluid and cooling fluid, the latter to absorb the heat of combustion of the test fluid, a movable element and means comprising resistance thermometers adapted to measure the resultant temperature rise of the cooling fluid for causing said element to move in accordance with the degree and character of variations in heating value per unit quantity of the test fluid, and means subjecting said indicating device to further influence in accordance with the degree and character of movement of said calorimeter movable element.

In witness whereof, I have hereunto subscribed my name.

HORACE N. PACKARD.